United States Patent
Mody et al.

(10) Patent No.: US 9,078,001 B2
(45) Date of Patent: Jul. 7, 2015

(54) EFFICIENT BIT-PLANE DECODING ALGORITHM

(71) Applicant: Texas Instruments Incorporated, Dallas, TX (US)

(72) Inventors: Mihir Narendra Mody, Bangalore (IN); Dinesh Kothandapani, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 50 days.

(21) Appl. No.: 13/920,238

(22) Filed: Jun. 18, 2013

(65) Prior Publication Data
US 2014/0369419 A1    Dec. 18, 2014

(51) Int. Cl.
G06K 9/36      (2006.01)
H04N 19/44     (2014.01)
H04N 19/436    (2014.01)
G06K 9/46      (2006.01)

(52) U.S. Cl.
CPC ............. *H04N 19/44* (2014.11); *H04N 19/436* (2014.11)

(58) Field of Classification Search
USPC ............... 382/232, 233; 375/240.03, 240.12, 375/240.16, 240.25, 240.27, E07.211, 375/E07.246, E07.279; 341/50, 51, 67; 348/398.1, 586; 712/208; 714/755, 785
See application file for complete search history.

(56) References Cited

U.S. PATENT DOCUMENTS

| | | | |
|---|---|---|---|
| 5,646,618 A * | 7/1997 | Walsh | 341/67 |
| 6,480,547 B1 * | 11/2002 | Chen et al. | 375/240.27 |
| 6,788,740 B1 * | 9/2004 | van der Schaar et al. | 375/240 |
| 7,606,308 B2 * | 10/2009 | Holcomb et al. | 375/240.16 |
| 2005/0275752 A1 * | 12/2005 | Li et al. | 348/398.1 |
| 2010/0135418 A1 * | 6/2010 | Zhang et al. | 375/240.25 |
| 2010/0226431 A1 * | 9/2010 | Yamasaki | 375/240.12 |
| 2012/0036337 A1 * | 2/2012 | Grossi | 712/208 |
| 2013/0177073 A1 * | 7/2013 | Yamasaki | 375/240.03 |
| 2014/0122962 A1 * | 5/2014 | Kodavalla | 714/755 |

* cited by examiner

*Primary Examiner* — Amir Alavi
(74) *Attorney, Agent, or Firm* — Robert D. Marshall, Jr.; Frank D. Cimino

(57) ABSTRACT

A bitplane decoding system where the bitplane operations are broken up into an optimized plurality of sub-tasks. A pipeline structure is established for the execution of said sub-tasks on a plurality of processors or dedicated hardware logic blocks in a manner that allows efficient execution of the sub-tasks in parallel across two processors, resulting in a significant increase in performance.

5 Claims, 5 Drawing Sheets

FIG. 6

| FEATURE | WMV9/VC-1 MAIN | VC-1 ADVANCED | H264 MAIN | H264 HIGH |
|---|---|---|---|---|
| PICTURE TYPE | I,P,B,BI, SKIPPED P | I,P,B,BI, SKIPPED P | I,P,B | I,P,B |
| INTRA PREDICTION | 3 DC/AC MODES IN FREQUENCY DOMAIN | 3 DC/AC MODES IN FREQUENCY DOMAIN | 9(4x4) + 4(16x16) IN PIXEL DOMAIN | 9(4x4) + 9(8X8) 4(16x16) IN PIXEL DOMAIN |
| MV ACCURACY | ¼ PEL (4 TAP BI-CUBIC OR BI-LINEAR) | ¼ PEL (4 TAP BI-CUBIC OR BI-LINEAR) | ¼ PEL (6+2 TAP) | ¼ PEL (6+2 TAP) |
| MC BLOCK SIZE | 16x16, 8x8 | 16x16, 8x8 | 16x16, 16x8, 8x16, 8x8, 8x4, 4x8, 4x4 | 16x16, 16x8, 8x16, 8x8, 8x4, 4x8, 4x4 |
| NUM REFERENCE FRAMES | 2 | 2 | 16 (LIMITED BY DPBmax) | 16 (LIMITED BY DPBmax) |
| TRANSFORM (I-INTEGER TX) | 8x8(I), 8x4(I), 4x8(I), 4x4(I) | 8x8(I), 8x4(I), 4x8(I), 4x4(I) | 4x4(I) | 4x4(I), 8x8(I) |
| TRANSFORM SCALING MATRICES | N/A | N/A | N/A | 8 ADJUSTABLE (PER SEQ OR PIC) |
| ENTROPY CODING | VLC, KIND OF CA-VLC | VLC, KIND OF CA-VLC | CA-VLC, CA-BAC | CA-VLC, CA-BAC |
| INTERLACE | N/A | MPEG-2 LIKE | PAFF, MBAFF | PAFF, MBAFF |
| IN-LOOP DEBLOCKING FILTER (NUM TAPS, PELS MODIFIED, PELS COMPARED) | 6, 2, 8 (NON-LINEAR FILTERING) | 6, 2, 8 (NON-LINEAR FILTERING) | 5 (MAX), 6, 8 (LINEAR FILTERING) | 5 (MAX), 6, 8 (LINEAR FILTERING) |

EFFICIENT BIT-PLANE DECODING ALGORITHM

TECHNICAL FIELD OF THE INVENTION

The technical field of this invention is video compression.

BACKGROUND OF THE INVENTION

Bitplane coding (BPC) is a tool specified in VC1 video standard to achieve optimum compression efficiency. It is a complex algorithm as information bits are organized across all Macroblocks (MB) in a video frame header. This results in implementing a fully sequential operation during video decoding.

Due this complexity, the bitplane coding algorithm is typically not implemented in dedicated hardware. In software implementations it is typically implemented on a single processor due to the complexity inherent in the algorithm.

SUMMARY OF THE INVENTION

This invention describes the following novel ideas:

The bitplane operations are broken up into a plurality of sub-tasks.

A pipeline structure is established for the execution of said sub-tasks in a way that allows efficient execution of the sub-tasks in parallel across two processors or two dedicated hardware blocks, resulting in a significant increase in performance.

BRIEF DESCRIPTION OF THE DRAWINGS

These and other aspects of this invention are illustrated in the drawings, in which:

FIG. 6 is a table comparing video compression standards.

DETAILED DESCRIPTION OF PREFERRED EMBODIMENTS

When the ITU (International Telecommunication Union) released the H.264/AVC (Advanced Video Coder) standard, the basic structure of a whole generation of video codecs was defined.

Many features, such as the merging of multiple pixels to macroblocks (MB), the utilization of temporal and spatial correlation or the usage of an entropy coder were derived from prior video coding standards and optimized to achieve better compression results. The presence of a complete decoder within the encoder is determined by the need for reconstructed image data in order to perform a proper prediction.

1) Encoder: First, each frame is separated into square MBs consisting of multiple pixels, each represented by a luma (Y) and two chroma (Cb, Cr) values. The MBs can be predicted by referencing already coded MBs of the same frame (intraframe coding) or of other frames (interframe coding).

In both cases the reference data is reconstructed from prior coded MBs. Either option requires the computation of the difference between the reconstructed and the predicted data. This residual is transformed and quantized according to an adjustable quantization table before it is fed to an entropy coder for further data compression.

2) Decoder: The decoder receives the compressed bit stream along with control data and, in case of interframe coding, motion vector data. After performing an inverse transformation, the MBs are decoded by adding the regained residual signal to the predicted data.

The decoded MBs pass through a deblocking filter in order to reduce the blocking artifacts typical for this codec paradigm. These altered MBs serve as reference for intra- and interframe coding in both encoder and decoder and are assembled to the displayable output stream of the decode.

Figure 1:
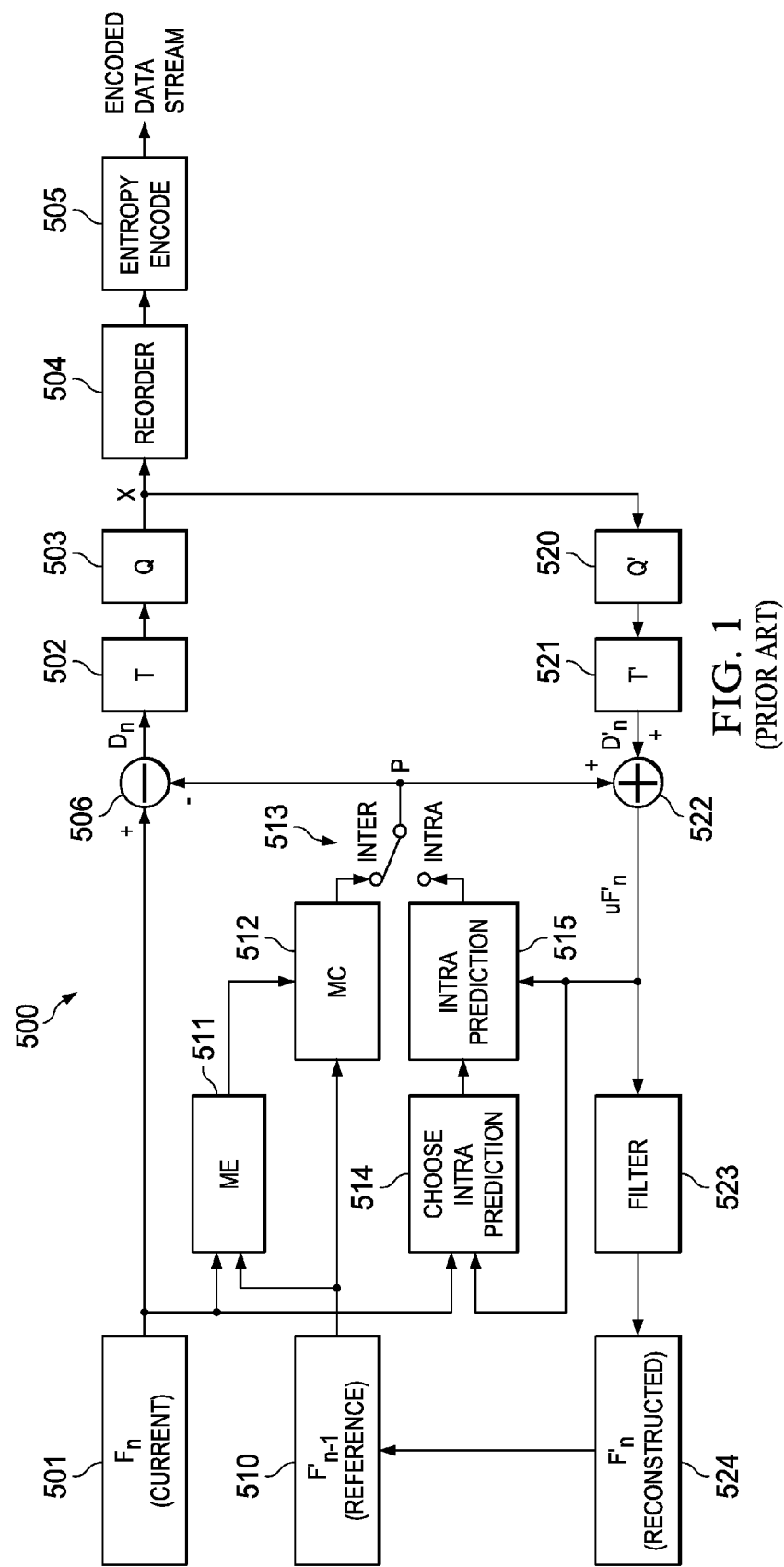
FIG. 1 shows the block diagram of a typical video encoder (H.264, VC1)
Figure 2:
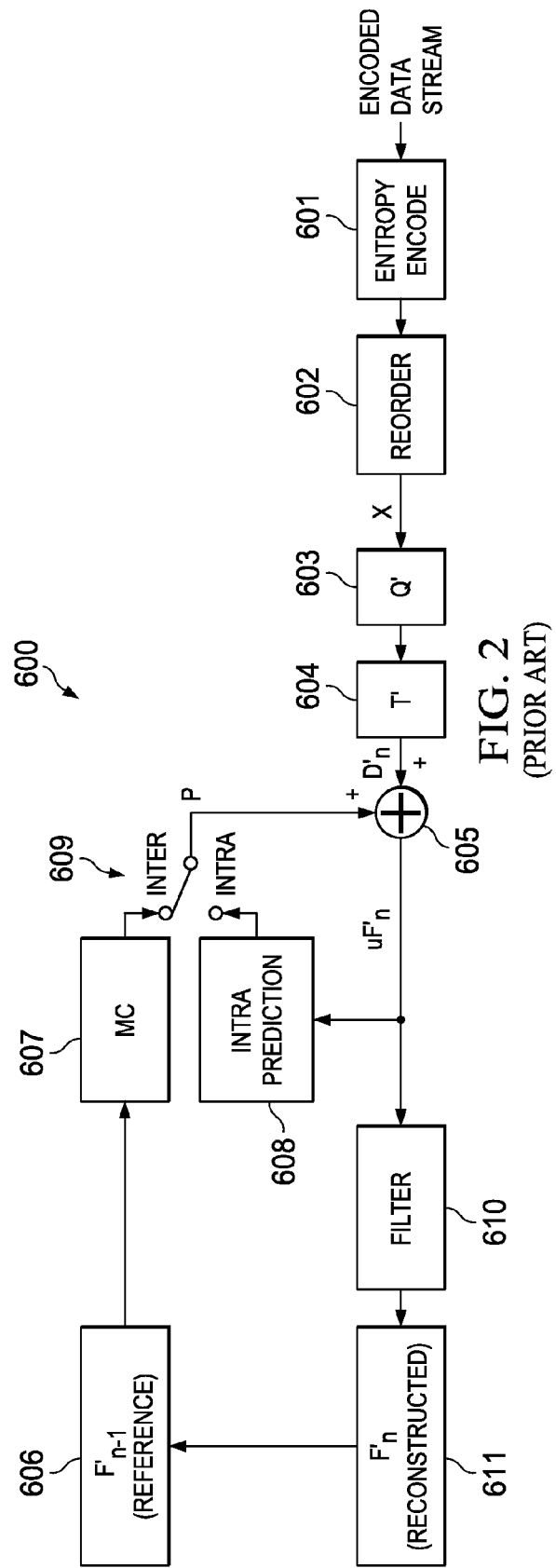
FIG. 2 shows the block diagram of a typical video decoder (H.264, VC1)

The operation of a prior art H.264/AVC or MPEG compression system is illustrated in FIGS. 1 and 2. FIG. 1 illustrates the encoding process 500 of video encoding according to the prior art. Many video encoding standards use similar processes such as represented in FIG. 1. Encoding process 500 begins with the n th (current) frame Fn 501. Frequency transform block 502 transforms a macroblock of the pixel data into the spatial frequency domain. This typically involves a discrete cosine transform (DCT).

This frequency domain data is quantized in quantization block 503. This quantization typically takes into account the range of data values for the current macroblock. Thus differing macroblocks may have differing quantizations. In accordance with the H.264 standard, in the base profile the macroblock data may be arbitrarily reordered via reorder block 504. As will be explained below, this reordering is reversed upon decoding. Other video encoding standards and the H.264 main profile transmit data for the macroblocks in strict raster scan order. The quantized data is encoded by entropy encoding block 505. Entropy encoding employs fewer bits to encode more frequently used symbols and more bits to encode less frequency used symbols. This process reduces the amount of encoded that must be transmitted and/or stored. The resulting entropy encoded data is the encoded data stream.

Video encoding standards typically permit two types of predictions. In inter frame prediction, data is compared with data from the corresponding location of another frame. In intra frame prediction, data is compared with data from another location in the same frame.

For inter prediction, data from n−1 th (previous) frame $F_{n-1}$ 510 and data from the n th frame $F_n$ 501 supply motion estimation block 511. Motion estimation block 511 determines via a search the positions and motion vectors of moving objects within the picture. This motion data is supplied to motion compensation block 512 along with data from n−1 th frame $F_{n-1}$ 510. The resulting motion compensated frame data is selected by switch 513 for application to subtraction unit 506. Subtraction unit 506 subtracts the inter prediction data from switch 513 from the input frame data from n th frame $F_n$ 501. Thus frequency transform block 502, quantization block 503, reorder block 504 and entropy encoding block 505 encode the differential data rather than the original frame data. Assuming there is relatively little change from frame to frame, this differential data has a smaller magnitude than the raw frame data. Thus this can be expressed in fewer bits contributing to data compression. This is true even if motion estimation block 511 and motion compensation block 512 find no moving objects to code. If the n th frame $F_n$ and the n−1 th frame $F_{n-1}$ are identical, the subtraction unit 506 will produce a string of zeros for data. This data string can be encoded using few bits.

The second type of prediction is intra prediction. Intra prediction predicts a macroblock of the current frame from another macroblock of the current frame. Inverse quantization block 520 receives the quantized data from quantization block 503 and substantially recovers the original frequency domain data. Inverse frequency transform block 521 transforms the frequency domain data from inverse quantization block 520 back to the spatial domain. This spatial domain data supplies one input of addition unit 522, whose function will be further described. Encoding process 500 includes choose intra predication unit 514 to determine whether to implement intra prediction. Choose intra prediction unit 514 receives data from n th frame Fn 501 and the output of addition unit 522. Choose intra prediction unit 514 signals intra prediction unit 515, which also receives the output of addition unit 522. Switch 513 selects the intra prediction output for application to the subtraction input of subtraction units 506 and an addition input of addition unit 522. Intra prediction is based upon the recovered data from inverse quantization block 520 and inverse frequency transform block 521 in order to better match the processing at decoding. If the encoding used the original frame, there might be drift between these processes resulting in growing errors.

Video encoders typically periodically transmit unpredicted frames. In such an event the predicted frame is all 0's. Subtraction unit 506 thus produces data corresponding to the n th frame Fn 501 data. Periodic unpredicted or I frames limits any drift between the transmitter coding and the receive decoding. In a video movie a scene change may produce such a large change between adjacent frames that differential coding provides little advantage. Video coding standards typically signal whether a frame is a predicted frame and the type of prediction in the transmitted data stream.

Encoding process 500 includes reconstruction of the frame based upon this recovered data. The output of addition unit 522 supplies deblock filter 523. Deblock filter 523 smoothes artifacts created by the block and macroblock nature of the encoding process. The result is reconstructed frame $F'_n$ 524. As shown schematically in FIG. 5, this reconstructed frame $F'_n$ 524 becomes the next reference frame $F_{n-1}$ 510.

FIG. 2 illustrates the corresponding decoding process 600. Entropy decode unit 601 receives the encoded data stream. Entropy decode unit 601 recovers the symbols from the entropy encoding of entropy encoding unit 505. Reorder unit 602 assembles the macroblocks in raster scan order reversing the reordering of reorder unit 504. Inverse quantization block 603 receives the quantized data from reorder unit 602 and substantially recovers the original frequency domain data. Inverse frequency transform block 604 transforms the frequency domain data from inverse quantization block 603 back to the spatial domain. This spatial domain data supplies one input of addition unit 605. The other input of addition input 605 comes from switch 609. In inter prediction mode switch 609 selects the output of motion compensation unit 607. Motion compensation unit 607 receives the reference frame F'n 1 606 and applies the motion compensation computed by motion compensation unit 512 and transmitted in the encoded data stream.

Switch 609 may also select an intra-prediction mode. The intra prediction is signaled in the encoded data stream. If this is selected, intra prediction unit 608 forms the predicted data from the output of adder 605 and then applies the intra prediction computed by intra prediction block 515 of the encoding process 500. Addition unit 605 recovers the predicted frame. As previously discussed in conjunction with encoding, it is possible to transmit an unpredicted or I frame. If the data stream signals that a received frame is an I frame, then the predicted frame supplied to addition unit 605 is all 0's.

The output of addition unit 605 supplies the input of deblock filter 610. Deblock filter 610 smoothes artifacts created by the block and macroblock nature of the encoding process. The result is reconstructed frame F'n 611. As shown schematically in FIG. 2, this reconstructed frame F'n 611 becomes the next reference frame Fn 1 606.

The deblocking filtering of deblock filter 523 and deblock 610 must be the same. This enables the decoding process to accurately reflect the input frame Fn 501 without error drift. The H.264 standard has a specific, very detailed decision matrix and corresponding filter operations for this process. The standard deblock filtering is applied to every macroblock in raster scan order. This deblock filtering smoothes artifacts created by the block and macroblock nature of the encoding. The filtered macroblock is used as the reference frame in predicted frames in both encoding and decoding. The encoding and decoding apply the identical processing the reconstructed frame to reduce the residual error after prediction.

VC-1 is a video codec specification that has been standardized by the Society of Motion Picture and Television Engineers (SMPTE) and implemented by Microsoft as Microsoft Windows Media Video (WMV) 9. Formal standardization of VC-1 represents the culmination of years of technical scrutiny by over 75 companies.

SMPTE 421M details the complete bit stream syntax and is accompanied by two companion documents (SMPTE RP227 and SMPTE RP228) that describe VC-1 transport and conformance. These documents provide comprehensive guidance to ensure content delivery and interoperability. Standardizing the decoder bit stream facilitates independent implementation of interoperable VC-1 encoders and decoders.

The VC-1 codec is designed to achieve state-of-the-art compressed video quality at bit rates that may range from very low to very high. The codec can easily handle 1920 pixel×1080 pixel presentation at 6 to 30 megabits per second (Mbps) for high-definition video. VC-1 is capable of higher resolutions such as 2048 pixels×1536 pixels for digital cinema, and of a maximum bit rate of 135 Mbps. An example of very low bit rate video would be 160 pixel×120 pixel presentation at 10 kilobits per second (Kbps) for modem applications.

The basic functionality of VC-1 involves a block-based motion compensation and spatial transform scheme similar to that used in other video compression standards since MPEG-1 and H.261. However, VC-1 includes a number of innovations and optimizations that make it distinct from the basic compression scheme, resulting in excellent quality and efficiency. VC-1 Advanced Profile is also transport and container independent. This provides even greater flexibility for device manufacturers and content services.

VC-1 includes a number of innovations that enable it to produce high quality content. This section provides brief descriptions of some of these features.

Adaptive Block Size Transform

Traditionally, 8×8 transforms have been used for image and video coding. However, there is evidence to suggest that 4×4 transforms can reduce ringing artifacts at edges and discontinuities. VC-1 is capable of coding an 8×8 block using either an 8×8 transform, two 8×4 transforms, two 4×8 transforms, or four 4×4 transforms. This feature enables coding that takes advantage of the different transform sizes as needed for optimal image quality.

16-Bit Transforms

In order to minimize the computational complexity of the decoder, VC-1 uses 16-bit transforms. This also has the advantage of easy implementation on the large amount of digital signal processing (DSP) hardware built with 16-bit processors. Among the constraints put on VC-1 transforms is the requirement that the 16-bit values used produce results that can fit in 16 bits. The constraints on transforms ensure that decoding is as efficient as possible on a wide range of devices.

Motion Compensation

Motion compensation is the process of generating a prediction of a video frame by displacing the reference frame. Typically, the prediction is formed for a block (an 8×8 pixel tile) or a macroblock (a 16×16 pixel tile) of data. The displacement of data due to motion is defined by a motion vector, which captures the shift along both the x- and y-axes.

The efficiency of the codec is affected by the size of the predicted block, the granularity of sub-pixel data that can be captured, and the type of filter used for generating sub-pixel predictors. VC-1 uses 16×16 blocks for prediction, with the ability to generate mixed frames of 16×16 and 8×8 blocks. The finest granularity of sub-pixel information supported by VC-1 is ¼ pixel. Two sets of filters are used by VC-1 for motion compensation. The first is an approximate bicubic filter with four taps. The second is a bilinear filter with two taps.

VC-1 combines the motion vector settings defined by the block size, sub-pixel granularity, and filter type into modes. The result is four motion compensation modes that suit a range of different situations. This classification of settings into modes also helps compact decoder implementations.

Loop Filtering

VC-1 uses an in-loop deblocking filter that attempts to remove block-boundary discontinuities introduced by quantization errors in interpolated frames. These discontinuities can cause visible artifacts in the decompressed video frames and can impact the quality of the frame as a predictor for future interpolated frames.

The loop filter takes into account the adaptive block size transforms. The filter is also optimized to reduce the number of operations required.

Interlace Coding

Interlaced video content is widely used in television broadcasting. When encoding interlaced content, the VC-1 codec can take advantage of the characteristics of interlaced frames to improve compression. This is achieved by using data from both fields to predict motion compensation in interpolated frames.

Advanced B Frame Coding

A bi-directional or B frame is a frame that is interpolated from data both in previous and subsequent frames. B frames are distinct from I frames (also called key frames), which are encoded without reference to other frames. B frames are also distinct from P frames, which are interpolated from previous frames only. VC-1 includes several optimizations that make B frames more efficient.

Fading Compensation

Due to the nature of compression that uses motion compensation, encoding of video frames that contain fades to or from black is very inefficient. With a uniform fade, every macroblock needs adjustments to luminance. VC-1 includes fading compensation, which detects fades and uses alternate methods to adjust luminance. This feature improves compression efficiency for sequences with fading and other global illumination changes.

Differential Quantization

Differential quantization, or dquant, is an encoding method in which multiple quantization steps are used within a single frame. Rather than quantize the entire frame with a single quantization level, macroblocks are identified within the frame that might benefit from lower quantization levels and greater number of preserved AC coefficients. Such macroblocks are then encoded at lower quantization levels than the one used for the remaining macroblocks in the frame. The simplest and typically most efficient form of differential quantization involves only two quantizer levels (bi-level dquant), but VC-1 supports multiple levels, too.

VC-1 contains a number of profile and level combinations that support the encoding of many types of video. The profile determines the codec features that are available, and thereby determines the required decoder complexity (mathematical intensity). The Table 1 lists VC-1 profiles and levels.

TABLE 1

| Profile | Level | Max Bit Rate | Representative Resolutions by Frame Rate |
|---|---|---|---|
| Simple | Low | 96 Kbps | 176 × 144 @ 15 Hz (QCIF) |
|  | Medium | 384 Kbps | 240 × 176 @ 30 Hz |
|  |  |  | 352 × 288 @ 15 Hz (CIF) |
| Main | Low | 2 Mbps | 320 × 240 @ 24 Hz (QVGA) |
|  | Medium | 10 Mbps | 720 × 480 @ 30 Hz (480p) |
|  |  |  | 720 × 576 @ 25 Hz (576p) |
|  | High | 20 Mbps | 1920 × 1080 @ 30 Hz (1080p) |
| Advanced | L0 | 2 Mbps | 352 × 288 @ 30 Hz (CIF) |
|  | L1 | 10 Mbps | 720 × 480 @ 30 Hz (NTSC-SD) |
|  |  |  | 720 × 576 @ 25 Hz (PAL-SD) |
|  | L2 | 20 Mbps | 720 × 480 @ 60 Hz (480p) |
|  |  |  | 1280 × 720 @ 30 Hz (720p) |
|  | L3 | 45 Mbps | 1920 × 1080 @ 24 Hz (1080p) |
|  |  |  | 1920 × 1080 @ 30 Hz (1080i) |
|  |  |  | 1280 × 720 @ 60 Hz (720p) |
|  | L4 | 135 Mbps | 1920 × 1080 @ 60 Hz (1080p) |
|  |  |  | 2048 × 1536 @ 24 Hz |

Bitplane coding of MB header data for all Macro-Blocks (MB) in video frames is used in VC1 standard.

Certain specific MB information which can be coded as one binary symbol per MB (such as a Flag indicating whether MB is INTRA or INTER), and the symbols corresponding to every MB in a frame are grouped into a plane called bitplane.

List of flags which can be coded as a bitplanes in VC-1 decoder are,

Flag signaling SKIP MB.

Flag signaling FIELD/FRAME MB mode.

Flag signaling 1-MV/4-MV mode of MB.

Flag signaling overlapped transform application on each MB in an I-frame in AP.

Flag signaling ACPRED in AP.

Flag signaling DIRECTMB.

Flag signaling FORWARDMB flag in interlaced field pictures.

The above mentioned bitplanes are coded and transmitted as a part of frame header information.

Figure 3:
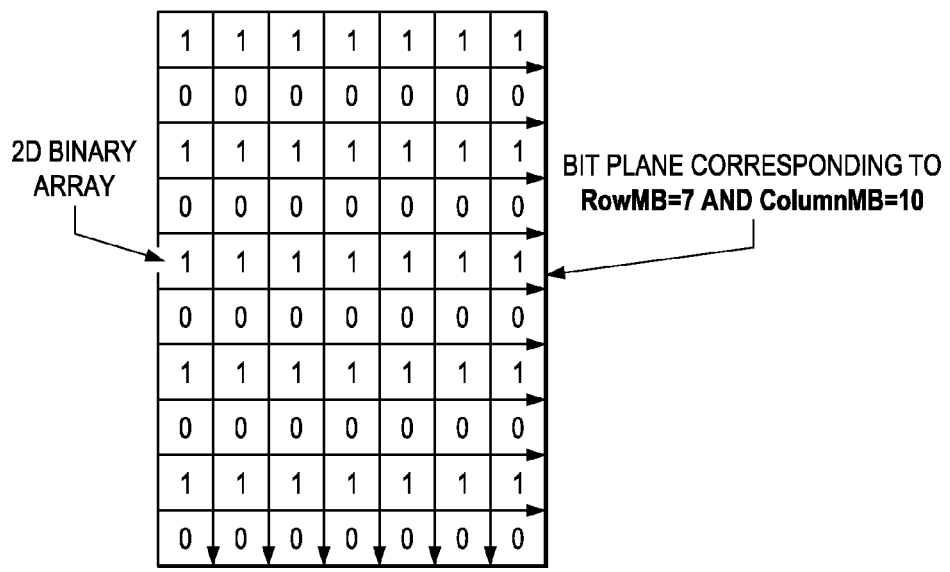
FIG. 3 shows a bitplane array.

These bitplanes are similar to 2-D binary arrays of size ROW_MB (Number of MBs in a row)×COLUMN_MB (Number of MBs in a column) as shown in FIG. 3.

Each bitplane can be coded using one of the following modes:

Raw mode: No bitplane coding is done and the information is part of MB level syntax element.

Normal-2 mode: 2 symbols are coded jointly [symbol here corresponds to binary flag].

Normal-6 mode: 6 symbols are coded jointly [symbol here corresponds to binary flag].

Differential-2 mode: Differential coding of bitplane followed by Normal-2 mode of coding.

Differential-6 mode: Differential coding of bitplane followed by Normal-6 mode of coding.

Rowskip mode: coded as one bit per symbol with one bit skip to signal rows with no set bits.

Columnskip mode: coded as one bit per symbol with one bit skip to signal columns with no set bits.

The complexity of the 7 modes of bitplane decoding algorithm in increasing order are:

Raw mode—Low complexity since no coding is done.

Rowskip mode—more complex than raw mode since 1 bit per symbol coding is done for non-skip rows.

Columnskip mode—more complex than Rowskip mode since 1 bit per symbol coding is done for non-skip columns (i.e.) writing the binary flags in column wise.

Normal-6 mode—more complex than Columnskip mode since Huffman coding is used to code the 6 symbols.

Normal-2 mode—more complex than Normal-6 mode since the Huffman decoding loop count is greater than that for Normal-6 mode because it can decode only 2 symbols from each code word where as Normal-6 can decode 6 symbols per code word.

Differential-6 mode—more complex than above mentioned modes since it has the overhead of differential prediction getting added to the Normal-6 mode of decoding [High complexity].

Differential-2 mode—more complex than above mentioned modes since it has the overhead of differential prediction getting added to the Normal-2 mode of decoding [High complexity]

As per the VC-1 standard each frame may contain at the maximum of 2 bitplanes.

Considering the worst case high complex bitplane decoding mode Differential-2/6 the performance impact will be very high in scenarios were each frame contains 2 Differential-2/6 mode bitplanes.

The following facts rule out any partitioning to assign each Bitplane to one processor (assuming 2 processors):

Since the bitplanes are part of frame header it is difficult to find the exact boundary between the 2 bitplanes, Because of above mentioned problem the idea of pipelining of 2 bitplane decoding operations on 2 different processors is ruled out.

Even if the boundary between 2 bitplanes is found through some method the implementation of above mentioned technique of pipelining 2 bitplane decoding operations on 2 different processors becomes complex because of following reasons:

Have to maintain 2 different stream buffers and handlers for the concurrent decoding on 2 Processors.

Have to move some header decoding code to the processor decoding the 2nd bitplane since there might be some additional header information available after the 2nd bitplane.

The toughest part is the synchronizing of the 2 stream buffer handlers and handling all the corner cases which arises during and after the decoding process.

Considering the fact that the differential mode of bitplane decoding [Differential-2/Differential-6] causes very high impact on performance in worst case scenarios like when each frame is coded with 2 bitplanes, the following method has been proposed for effective implementation of differential mode of bitplane decoding.

As mentioned earlier the differential mode of bitplane decoding can be split into 2 functional modules, Normal mode of decoding [either Normal 6 or Normal 2] which is basically Huffman decoding.

Differential prediction on the decoded residual bitplane by the above method.

Some of the facts of differential prediction are,

This differential prediction algorithm is common for both Differential-2 & Differential-6 mode of bitplane decoding.

This differential prediction is completely operated upon the decoded bitplane and not on the stream buffer data.

This differential prediction is done for each binary flag corresponding to each MB so the loop count is about (ROW_MB*COLUMN_MB) regardless of whether it is operating on (Normal-2/Normal-6) decoded bitplane.

In case of full-HD resolution this differential prediction consumes considerable amount of Processor cycles.

Based on some of the complexity which has been discussed and some of the observed features of differential prediction a method of pipelining of 2 bitplane decoding between 2 processors has been proposed.

Figure 4:
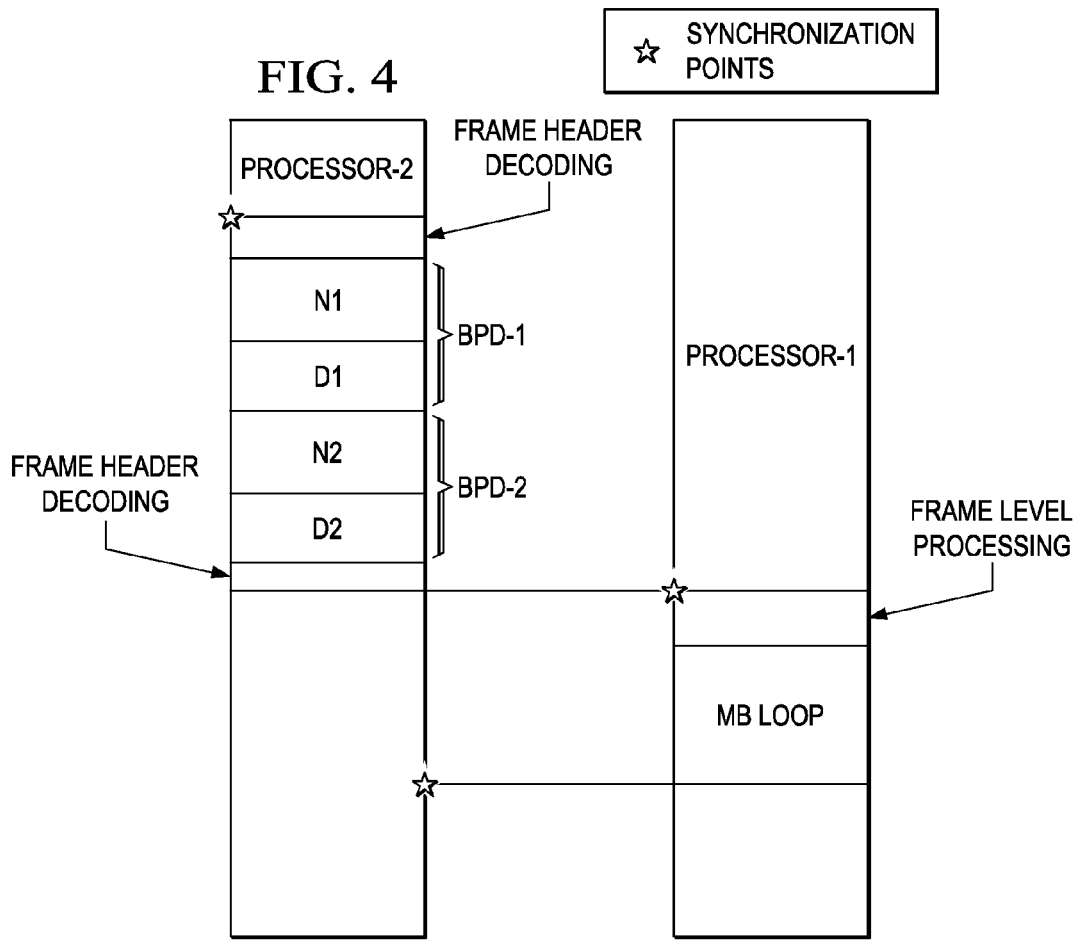
FIG. 4 shows the non-pipelined control flow.
Figure 5:
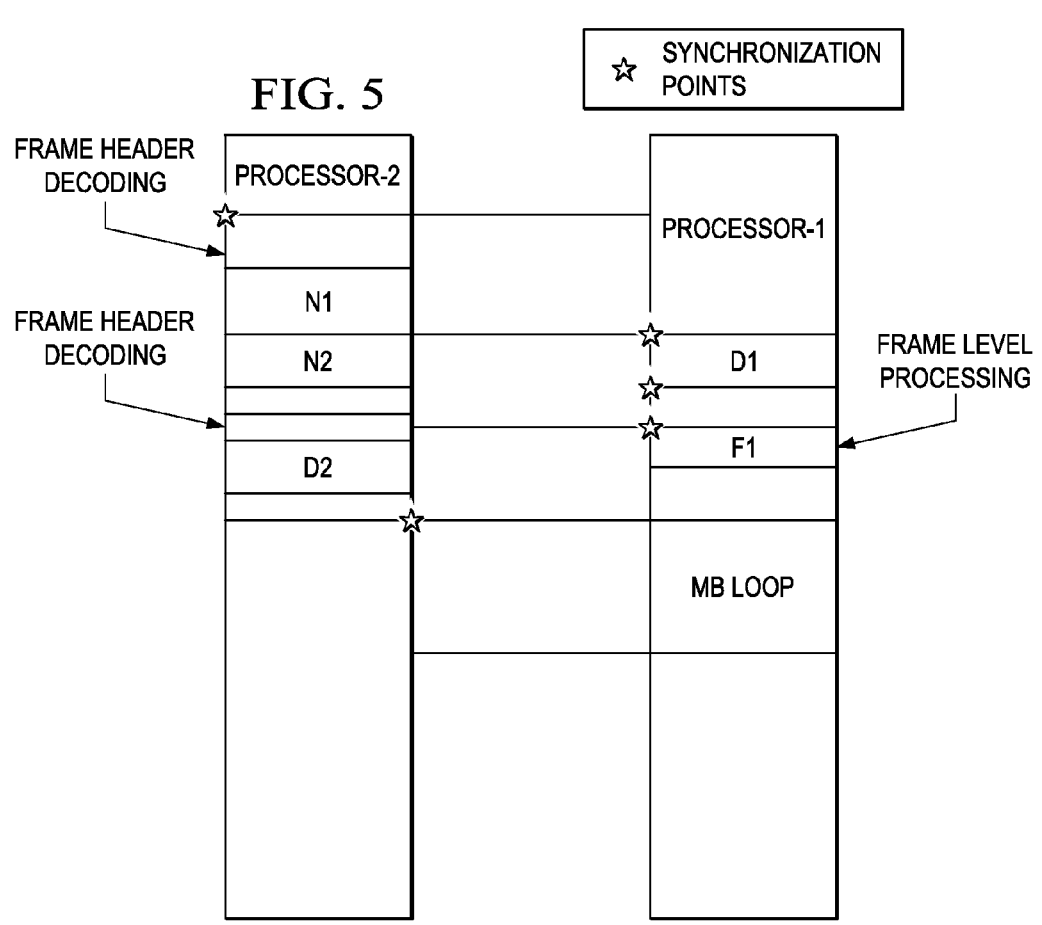
FIG. 5 shows the pipelined control flow.

FIG. 4 shows non-pipelined flow in a two processor implementation and details of pipelining stages as described in this invention are shown on FIG. 5:

Here bitplane decoding (N1) of first bitplane is done on Processor-2 where the frame header decoding is also done.

Once the decoding of N1 is completed the differential prediction (D1) of first bitplane is started on Processor-1 meanwhile the bitplane decoding (N2) of second bitplane is done by the Processor-2 concurrently.

Once the decoding of N2 is over Processor-2 continues its frame header decoding and other operations to be performed on Processor-2 without doing the differential prediction (D2) of second bitplane.

Once above step is completed Processor-2 starts Processor-1 for doing some of the operation to be performed at frame level meanwhile Processor-2 starts the differential prediction (D2) of second bitplane.

Once the operations to be performed on Processor-1 are completed Processor-1 waits for the completion of the decoding D2 on Processor-2 before starting the MB loop.

Notations used:

N1—Normal-1/Normal-2 mode of decoding first bitplane

D1—Differential prediction of first bitplane

N2—Normal-1/Normal-2 mode of decoding second bitplane

D2—Differential prediction of second bitplane.

FIG. 6 shows a comparison of features between VC-1 and H.264.

What is claimed is:

1. A method of video decoding having macroblock information bitplane encoded header employing two data processors comprising the steps of:

employing a first data processor to bitplane decode a first bitplane of a macroblock header where the first bitplane is coded in either Normal-2 mode having two symbols coded jointly or Normal-6 mode having six symbols coded jointly;

on completion of said first bitplane decoding of the macroblock header by the first data processor, employing a second data processor to differentially predict the first bitplane concurrently with employing the first data processor to bitplane decode a second bitplane of the macroblock header where the second bitplane is coded in either Normal-2 mode having two symbols coded jointly or Normal-6 mode having six symbols coded jointly;

on completion of said second bitplane decoding of the macroblock header by the first data processor, employing the first processor to perform frame header decoding without differentially predicting the second bitplane;

on completion of the further macroblock header decoding by the first data processor, employing the first data processor to differentially predict the second bitplane concurrently with employing the second data processor to perform a frame level operation; and on completion of said frame level operation by the second data processor, the second data processor waits for completion of the differentially predicting the second bitplane by the first data processor before starting a macroblock loop.

2. The method of video decoding of claim 1, wherein:

video data including macroblock information bitplane encoded header includes a plurality of encoded bitplanes within a video frame.

3. The method of video decoding of claim 1, further comprising the step of:

performing said bitplane decoding process as a number of sub tasks.

4. The method of video system of claim 3, further comprising the step of:

assigning the sub tasks to a plurality of data processors in a synchronized pipeline manner.

5. The method of video decoding of claim 1, further comprising the step of:

assigning a plurality of dedicated hardware logic blocks operable to decode an encoded bitplane within a video frame.

* * * * *